United States Patent [19]

Hoshino

[11] 4,010,445

[45] Mar. 1, 1977

[54] WORD RECOGNITION APPARATUS

[75] Inventor: Yukio Hoshino, Tokyo, Japan

[73] Assignee: Nippon Electric Company, Ltd., Tokyo, Japan

[22] Filed: Sept. 19, 1975

[21] Appl. No.: 614,984

[30] Foreign Application Priority Data

Sept. 25, 1974  Japan .......................... 49-110295

[52] U.S. Cl. .................................. 340/146.3 WD
[51] Int. Cl.² ........................................ G06K 9/00
[58] Field of Search ............. 340/146.3 WD, 172.5

[56] References Cited

UNITED STATES PATENTS 3,273,130   9/1966   Baskin et al. ........... 340/146.3 WD

*Primary Examiner*—Joseph M. Thesz
*Attorney, Agent, or Firm*—Sughrue, Rothwell, Mion, Zinn & Macpeak

[57] ABSTRACT

A word recognition apparatus using a dictionary of words is disclosed. The apparatus comprises, first of all, word storing means which stores words based on the classification of a plurality of words to be retrieved in block units. The words are stored in the order of block numbers so that characters placed in one or more given positions of a word forming an input character string may be used as a retrieving key. A block-starting-address storing means is provided for storing starting addresses of the clock units in the word storing means. A block-starting-address and limit-address taking-out means takes out a block starting address corresponding to a designated block number and a block limit address corresponding to a block number next to the designated number from the blockstarting-address storing means. An input-character-string storing means stores the string of characters recognized by a character recognition system. A block-number determining means responsive to the input-character-string storing means sequentially designates the number of blocks containing words having recognized characters of characters placed in the retrieving key positions of the input character string. A word taking-out means sequentially takes out words stored in the addresses beginning with the block starting address of the word storing means and ending with an address short of the block limit address by using the starting address and the block limit address which are taken out from the block-starting address storing means with the block number used as the retrieving key. Finally, a word comparing means is provided for detecting a word similar to the input character string to a degree over a given value by the comparison of the words thus taken out with the input character string.

4 Claims, 6 Drawing Figures

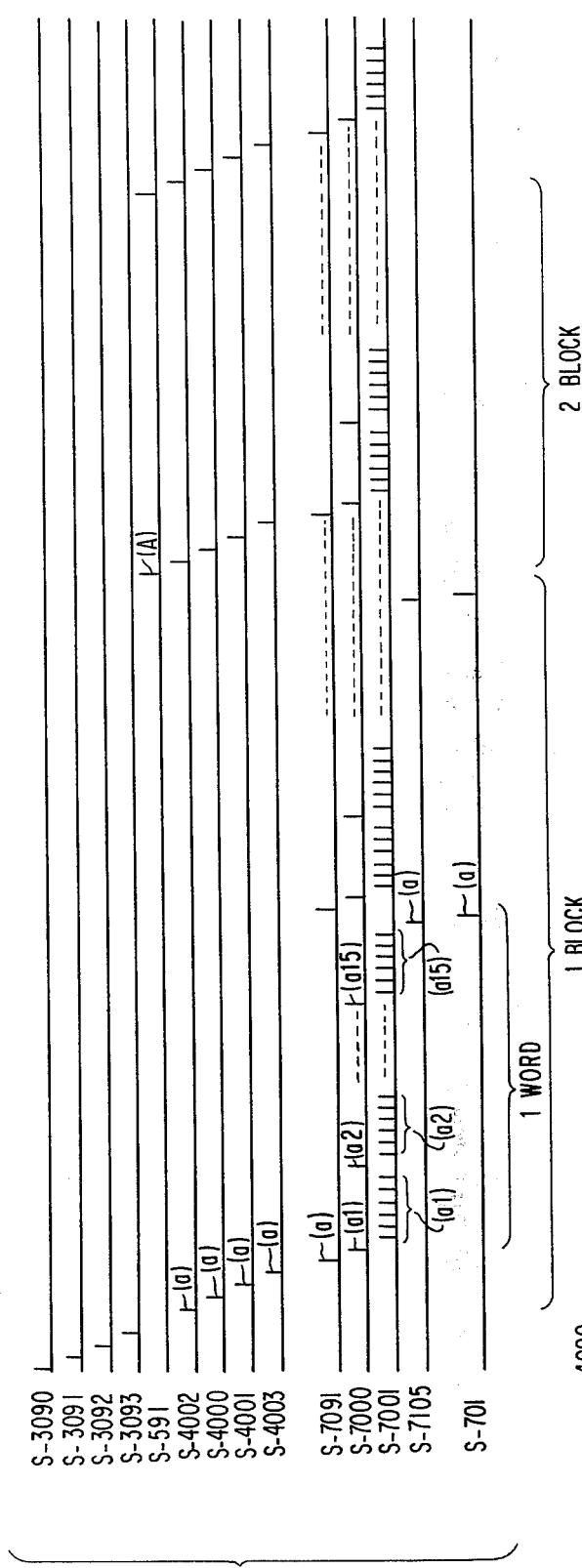
FIG. 4
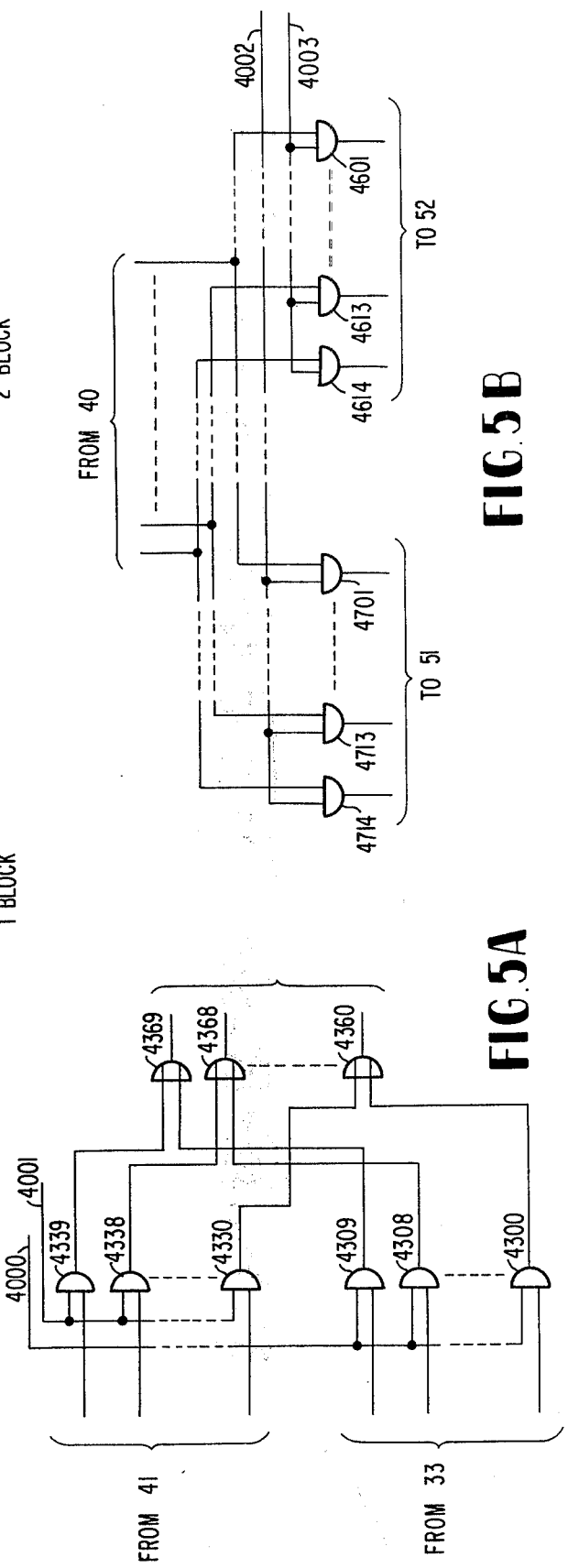
FIG. 5A
FIG. 5B

WORD RECOGNITION APPARATUS

BACKGROUND OF THE INVENTION

This invention relates to a word recognition apparatus capable of retrieving a word which is most similar to a character string read out by an optical character recognition (OCR) system by the use of a dictionary of words, and more particularly to a word recognition apparatus for use in improving the reading capability of an address read from a postal matter through the OCR system.

The aforesaid character recognition system is well-known. For example, reference is made to Pages 129 to 146 of the text by George L. Fisher, Jr., et al. entitled, *Optical Character Recognition*, published by Spartan Books, McGregor & Werner Inc., in 1962. Hitherto, it has been proposed to correct at a word level a character string, recognized in the character recognition system, by using a dictionary. The use of a dictionary, however, has the disadvantage of requiring a very large memory capacity in the case where the number or words to be stored in the dictionary is great. A far greater shortcoming of this approach is that many processing hours are required. No proposals have been made for the solution of this problem except for a very brief description given on Pages 397 to 403 in a paper by Edward M. Riseman et al entitled "Contextual Word Recognition Using Binary Diagrams" published in *IEEE Transactions On Computers*, April, 1971, whereby words within a block (in a dictionary) having the same character number as that of characters in a character string to be generated from the character recognition system are searched so as to select a word which most matches the character string. However, as the number of words having the same character number becomes greater, the adoption of this approach results in too many processing hours which is a great disadvantage.

SUMMARY OF THE INVENTION

It is an object of the present invention to provide a word recognition apparatus capable of avoiding the above-mentioned disadvantages experienced in the prior art word recognition apparatus performing word recognition using a dictionary at a high speed.

The word recognition apparatus of the invention comprises, first of all, word storing means which stores words based on the classification of a plurality of words to be retrieved in block units. The words are stored in the order of block numbers so that characters placed in one or more given positions of a word forming an input character string may be used as a retrieving key. A block-starting-address storing means is provided for storing starting addresses of the block units in the word storing means. A block-starting-address and limit-address taking-out means takes out a block starting address corresponding to a designated block number and a block limit address corresponding to a block number next to the designated number from the block-starting-address storing means. An input-character-string storing means stores the string of characters recognized by a character recognition system. A block-number determining means responsive to the input-character-string storing means sequentially designates the number of blocks containing words having recognized characters of characters placed in the retrieving key positions of the input character string. A word taking-out means sequentially takes out words stored in the addresses beginning with the block starting address of the word storing means and ending with an address short of the block limit address by using the starting address and the block limit address which are taken out from the block-starting-address storing means with the block number used as the retrieving key. Finally, word comparing means are provided for detecting a word similar to the input character string to a degree over a given value by the comparison of the words thus taken out with the input character string.

For better understanding of the advantages of the present invention, assumptions are made as follows:

1. The three initial characters of a certain word consisting of an input character string are used as the retrieving key positions for the word.

2. The quality of characters to be read by the character recognition system which reads an address entered on a postal matter is very low so that the present invention is advantageously applied to the system. For this reason, the rejection rate of the respective characters by the character recognition system is 10%, while the recognition rate is 90%.

3. There are 26 kinds of the characters to be read by the character recognition system, and they are coded in 10 groups as given in Table 1, below.

TABLE 1

| Character | Code |
|---|---|
| A, B | 0 |
| C, D | 1 |
| E, F, G | 2 |
| H, I | 3 |
| J, K, L | 4 |
| M, N, O | 5 |
| P, Q | 6 |
| R, S | 7 |
| T, U, V | 8 |
| W, X, Y, Z | 9 |

4. The number of different addresses which may read by the OCR system from the various postal matters handled is 10,000. Accordingly, the number of words in the dictionary is 10,000.

5. The duration from the time when a word is taken out of the dictionary until the word is compared with a given input character string is 50 $\mu s$ (microseconds).

When the initial three characters in the input character string are recognized, it is assumed that the respective characters except for rejected characters are represented by $\alpha$, $\beta$, and $\gamma$, while the characters for which recognition is rejected are represented by ?, and in addition, characters for which the recognition may be either rejected or accepted are represented by $\Delta$.

On the basis of the assumed recognition rate of the characters, probability (90% × 90%) for ($\alpha\ \beta\ \gamma$) is 81.0%, probability (90% × 10% × 90%) for ($\alpha$ ? $\gamma$), is 8.1% and probability (10% × 90% × 90%) for (? $\beta\ \gamma$) is 8.1%.

As a result, the probability at which two or more characters are recognized for the initial three characters will be 97.2%.

It is assumed that the average 100 words corresponding to 1/100 of 10,000 words are read out by using the two recognized characters of these three characters as a retrieving key, and the average words are compared with the input character string. In this case, two of the three characters in the input character string may be used as the retrieving key to compare only the average words of 1/100 of the total words. In addition, even if the recognition rate per character is 90%, the recognition rate for two or more characters of three characters becomes 97.2% so that the improvements may be achieved not only in the processing speed but also in the prevention of deterioration of the recognition performance.

BRIEF DESCRIPTION OF THE DRAWINGS

The present invention will be described in more detail in conjuction with the accompanying drawings in which:

FIG. 4 shows a timing chart of control signals fed to processing circuits of FIG. 1 by the control 8; and FIGS. 5A and 5B show logic diagrams of selectors 42 and 46 used in FIG. 1.

DESCRIPTION OF THE PREFERRED EMBODIMENT

Figure 1:
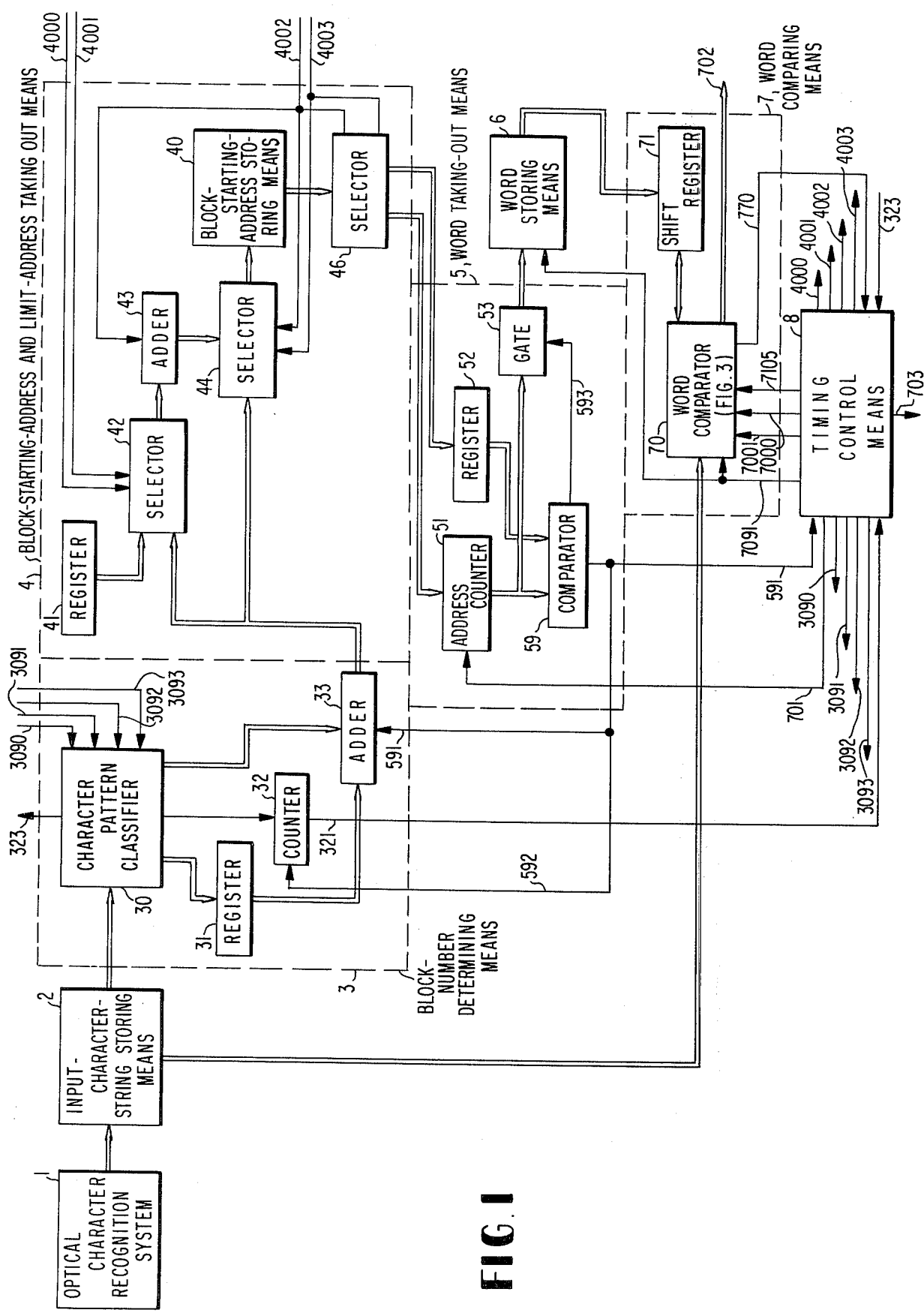
FIG. 1 shows a block diagram of one embodiment of the present invention.

In FIG. 1, the present invention specifically relates to the processing which occurs after the character string, such as for the address appearing on the postal matter, has been read by the OCR system and stored in an input-character-string storing means 2. The character string is recognized by a well-known character recognition system as shown in FIG. 4 of the above-referenced text by George L. Fischer, Jr., et al.

The word recognition apparatus of the present invention consists of the input-character-string storing means 2, a block-number determining means 3, a block-starting-address and limit-address taking-out means 4, a word taking-out means 5, a word storing means 6, a word comparing means 7 and a timing control means 8. Also, although the description for values used to explain this invention is given in the decimal representation throughout the specification, it will be understood by those skilled in the art that each circuit of the present apparatus actually performs the binary operation by using binary values corresponding to the decimal values.

Firstly, respective words are classified according to the codes shown in Table 1, and stored in the word storing means 6 as shown in Table 2. The number of bits for storing the respective words is 90 so as to permit the storage of 15 characters each consisting of 6 bits. A space is added to a word which is short of 15 characters to treat the word as that having 15 characters. Also, it is assumed that there is no word having more than 15 characters. Now, let us assume that the words as shown in Table 2 are given on the postal matter as the address to be recognized. Referring to Table 2, words from address 2600 to address 2624 constitute one block having the same code (257). Words from address 2625 and thereafter constitute a block having a code (258). Moreover, a code (207) represents a word block covering addresses from 2000 to 2061, and a code (208) represents a word block covering addresses from 2062 and thereafter.

TABLE 2

| Address | Word |
| --- | --- |
| ----→ 2000 | EAR |
| : | : |
| ----→ 2062 | ECSTIZE |
| : | : |
| ----→ 2600 | ENRAGE |
| 2601 | ENRAPTURE |
| 2602 | ENRICH |
| 2604 | ENSEMBLE |
| 2605 | ENSANGUINE |
| : | : |
| 2612 | ENSURE |
| 2613 | EOS |
| 2614 | EOSIN |
| 2615 | GORAL |
| : | : |
| ----→ 2625 | EM |
| 2626 | EMULATE |
| 2627 | EMULTATION |
| : | : |

A block-starting-address storing means 40 in the means 4 has a storage capacity of 1000 words covering addresses from 000 to 999, and thus a block starting address $A_{ijk}$ of a code $(ijk)$ is stored in an $(i \times 100 + j \times 10 + k)$ address. Referring to Table 2, a block starting address 2000 for the code (207) is stored in an address (207) in the storing means 40. Similarly, the block starting addresses for respective codes are stored in the addresses in the means 40 corresponding to the codes. For instance, the following relationship among them are maintained.

| Address in the means 40 | Code | Block Starting Address |
| --- | --- | --- |
| 208 | (208) | 2062 |
| : | : | : |
| 257 | (257) | 2600 |
| 258 | (258) | 2625 |
| : | : | : |

Since the largest block-starting-address is address 10,000, the number of binary bits required for storing the respective block starting addresses in the storing means 40 is 14.

A pattern classifier 30 in the block-number determining means 3 determines to which of the pattern ($\alpha\alpha\Delta$), ($\alpha$ ? $\beta$) or ($\alpha\beta\gamma$) the initial three characters in the given input character storing means 2 belongs to, and the block spacing between the initial block to be read out from the word storing means 6 and the block to be read out is subsequently set in an adder 33 and a register 31, respectively, and a counter 32 which counts the block numbers is brought to zero. For instance, if the input character string is E?SEMBLE, the pattern of the initial three characters of the word is represented as ($\alpha$ ? $\gamma$), and the initial three characters E?S are coded according to Table 1. This denotes the possibility that the word corresponding to the input character string is present in either one of 10 blocks of codes (207), (217), ... and (297). In the case of the pattern ($\alpha$ ? $\gamma$)

= (E?S), the first block number will be $\alpha \times 100 + \gamma = 2 \times 100 + 7 = 207$, and this value is set in the adder 33, and at the same time, a value 10 representing the block spacing is set in the register 31. Similarly, in the case of EN?EMBLE, the pattern of the initial three characters of the word is represented as $(\alpha \beta \Delta) = (EN\Delta)$, giving a first block number of $\alpha \times 100 + \beta \times 10 = 2 \times 100 + 5 \times 10 = 250$ so that blocks to be read out from the word storing means 6 are given in the form of codes (250), (251), (252), . . . and (259). At this time, a value of the block spacing will be 1. Therefore, a value 250 is set in the adder 33, and a value 1 is set in the register 31, respectively. Additionally, in case of ?NSEMBLE, the above-mentioned pattern is represented as $(? \beta \gamma) = (?NS)$ giving a first block number of $\beta \times 10 + \gamma = 5 \times 10 + 7 = 57$, so that blocks to be read out from the storing means 6 are given in the form of codes (057), (157), . . . and (957). Accordingly, a value 057 is set in the adder 33, and a value 100 for the block spacing is set in the register 31. When the initial three characters do not belong to any one of the aforesaid patterns $(\alpha ? \gamma)$, $(\alpha \beta \Delta)$ and $(\alpha \beta \gamma)$, a signal is generated from the box 30 to a signal line 323 to notify the timing control means 8 that the input character string can not be read out.

Then, the block number for designating a block in the word storing means 6 and indicated by the adder 33 in the means 3 is given to the block-starting-address and limit-address taking-out means 4. By this means, the block starting address and limit address corresponding to the designated block number are supplied to the word taking-out means 5. In other words, an adder 43 in the means 4 is cleared by means of a control signal S-4002(a) in FIG. 4) produced by the timing control means 8 on a signal line 4002, and simultaneously, the adder 33 and an address counter 51 in the means 5 are selected by selectors 44 and 46. The contents of the adder 33 is set in an address register (not shown) of the storing means 40, and the block starting address thus read out is set in the address counter 51 of the word taking-out means 5.

FIG. 5B shows a logic diagram of the selector 46 of FIG. 1. As soon as the control signal (S-4002 (a) in FIG. 4) is fed from the timing control means 8 to the signal line 4002, a signal from the storing means 40 is set through AND gates 4701, . . . , 4713 and 4714 in the address counter 51. Upon the supply of a control signal (S-4003 (a) in FIG. 4) from the timing control means 8 to a signal line 4003, a signal from the storing means 40 is set through AND gates 4601, . . . , 4613 and 4614 in a register 52. The generation of a signal (S-400 (a) in FIG. 4) by the timing control means 8 in FIG. 1 on a signal line 4000 permits the selection of the adder 33 by a selector 42 so that the contents thereof may be added to the adder 43.

Figure 2:
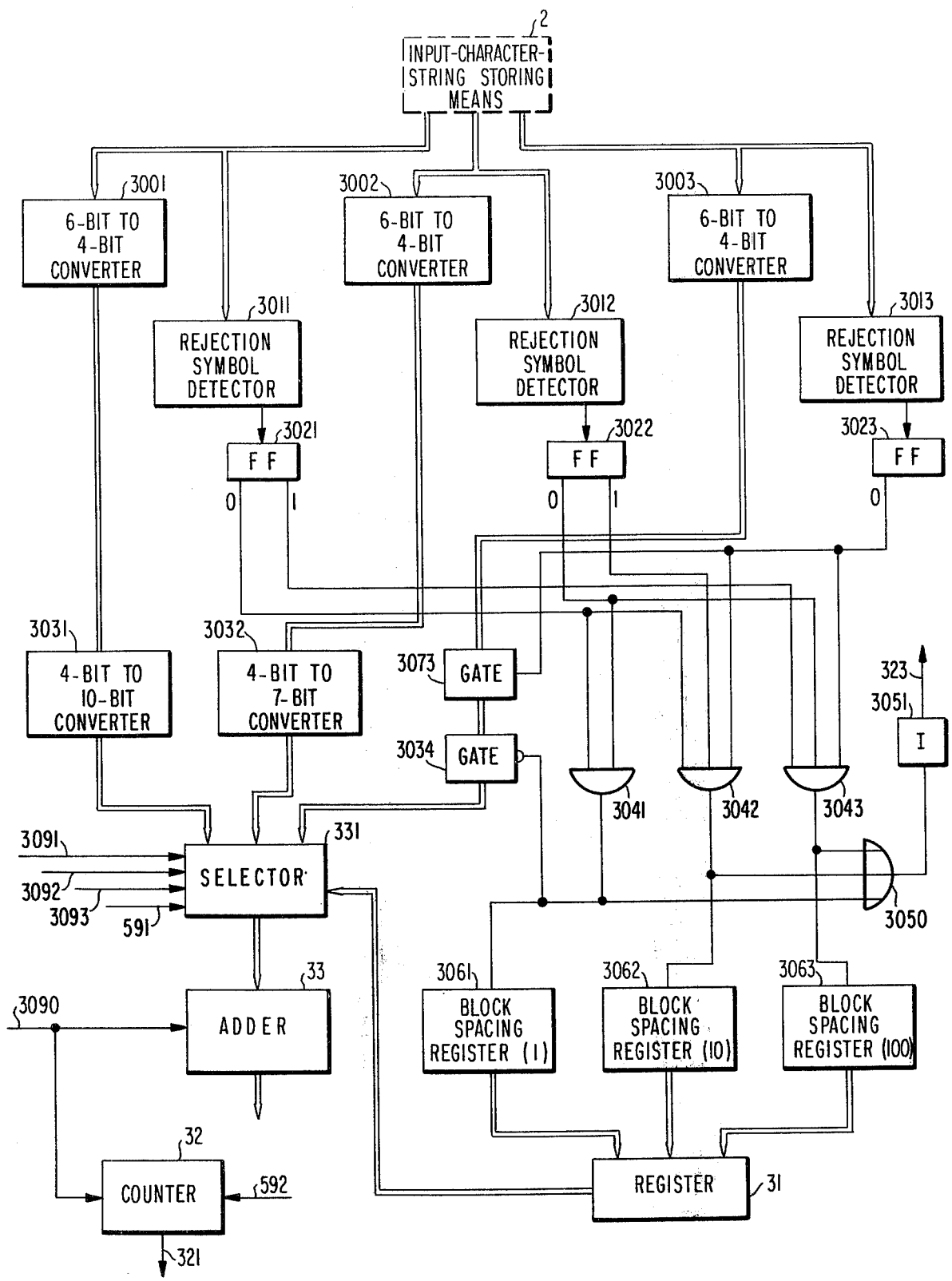
FIG. 2 shows a diagram of the block-number determining means 3 of FIG. 1.

FIG. 5A shows a logic diagram of the selector 42 of FIG. 1. In response to the control signal (S-400 (a) in FIG. 4) produced from the timing control means 8 of FIG. 1 on the signal line 4000, the contents of the adder 33 of FIG. 2 are set in the adder 43 through AND gates 4300, . . . , 4308 and 4309 and OR gates 4360, . . . , 4368 and 4369. Similarly, according to a signal (S-4001 (a) in FIG. 4), the contents of a register 41 are set by way of AND gates 4330, . . . , 4338 and 4339 and the OR gates 4360, . . . , 4368 and 4369. The circuit structure of selectors 44 and 331 (shown in FIG. 2) is similar to that of FIG. 5A.

Subsequently, a signal (S-4001 (a) in FIG. 4) is generated by the timing control means 8 on a signal line 4001 to select the register 41, and then a constant 1 set therein is added to the adder 43. The contents of the adder 43 are set in an address register (not shown) in the block-starting-address storing means 40, and the block starting address read out according to the contents thus set is set in a register 52 in the means 5 as a block limit address. The selection for the adder 43 and register 52 is performed by the supply of the signal (S-4003 (a) in FIG. 4) from the timing control means 8 to the signal line 4003 through the selectors 44 and 46, respectively. As can be seen from FIG. 4, the presence of the signals on the signal lines 4000, 4001, 4002, and 4003 shows that a new input character string has been set in the input-character-string storing means 2 or that the comparison of one input character string with words in the respective blocks has been completed. The contents of the address counter 51 in the means 5 are set in an address register (not shown) in the word storing means 6, and then the contents of the means 6 corresponding to that address set in the register are read out as a word to a shift register 71 of the word comparing means 7 in response to a control signal (S-7091 (a) in FIG. 4) appearing on a signal line 7091.

One input character string is supplied to the word comparing portion 70 of the word comparing means 7 through a signal line 201 connected to the storing means 2 in response to the control signal (S-7091 (a) in FIG. 4) fed to the signal line 7091. The input character string thus placed in the comparing portion 70 is compared therein with the words to be sequentially taken out from the word storing means 6 to the shift register 71 under the control of control signals (S-7000 (a1), (a2), . . . , (a15), S-7001 (a1), (a2), . . . , (a15) and S-7105(a)). If a word similar to the given input character string to a degree over a given value is detected, the word is taken out as the output from the comparing portion 70 to a signal line 702, and simultaneously, a signal representing that a similar word has been detected is fed to the timing control means 8 by way of a signal line 770. The comparison of the input character string with a single word readout from the word storing means 6 is accomplished by the word comparing means 7, and as a result, in the case where it is detected that there is no similar word, a control signal (S-701(a) in FIG. 4) is fed from the timing control means 8 to a signal line 701, and a signal is sent to the address counter 51 of the means 5. Thereafter, the contents of the address counter 51 representing the address to be read out next by the word storing means 6 are compared with the contents (representing the block limit address in the means 6) of the register 52 so as to determine whether or not the former is equal to the latter. If the former is equal to the latter, a signal representing that the comparison of the given input character string with the words of this block has been completed is given to signal lines 591 and 592 from the comparator 59. If the result of the comparison shows that the contents of the address counter 51 are not equal to that of the register 52, a signal 1 is fed from the comparator 59 to the signal line 593, and gate 53 is opened to transfer the contents of the counter 51 to an address register (not shown) in the word storing means 6. By the supply of a signal (S-591 (A) in FIG. 4) to the signal line 591 from the comparator 59 or, in other words, by the completion of the retrieval of a single block, the contents of the register 31 are added to the adder 33, and the block number in the word storing means 6 which is to be read out next is increased by the contents of register 31. The signal line 592 branched from the signal line 591 is connected to the counter 32 for counting these block numbers falling in the retrieving range of the words which are to be read out from the storing means 6. Upon the appearance of a signal on the signal line 592, a value 1 is added to the counter 32. If the content of counter 32 is equal to 10, a signal is fed to a signal line 321. This signal denotes that 10 block numbers including the words to be compared have been generated.

When a signal denoting that a word similar to the input character string to the degree over the given value has been detected is fed to the signal line 770 from the word comparing means 7, or when the comparison of words of 10 blocks with the input character string has been completed and thus a signal is fed to the signal line 321, or otherwise when a signal is generated from the block-number determining means 3 to a signal line 323 because two or more characters in the initial three characters in the input character string are not coded to the codes 0 to 9 according to Table 1, a signal is generated by the timing control means 8 on a signal line 703 to indicate that the word recognition of the address described on the postal matter has been completed.

FIG. 2 shows in detail the arrangement of the means 3 of FIG. 1. The initial three characters are supplied from storing means 2 of FIG. 1 to 6-bit to 4-bit converters 3001, 3002, and 3003 and coded according to Table 1. Rejection symbols "?" representing a rejection are detected in the rejection symbol detectors 3011, 3012 and 3013. If the rejections symbols "?" are detected, the corresponding flip-flops 3021, 3022 and 3023 are set.

The outputs of the converters 3001 and 3002 are converted into 10-bit code and 7-bit code shown in the righthand portions in Tables 3 and 4 by means of 4-bit to 10-bit converter 3031 and 4-bit to 7-bit converter 3032, respectively.

TABLE 3

| 0 | 0 | 0 | 0 | 0 | 0 | 0 | 0 | 0 | 0 | 0 | 0 | 0 |
|---|---|---|---|---|---|---|---|---|---|---|---|---|
| 0 | 0 | 0 | 1 | 0 | 0 | 0 | 1 | 1 | 0 | 0 | 1 | 0 |
| 0 | 0 | 1 | 0 | 0 | 0 | 1 | 0 | 0 | 0 | 1 | 0 | 0 |
| 0 | 0 | 1 | 1 | 0 | 1 | 0 | 0 | 1 | 0 | 1 | 1 | 0 |
| 0 | 1 | 0 | 0 | 0 | 1 | 1 | 0 | 0 | 1 | 0 | 0 | 0 |
| 0 | 1 | 0 | 1 | 0 | 1 | 1 | 1 | 1 | 1 | 0 | 1 | 0 |
| 0 | 1 | 1 | 1 | 1 | 0 | 1 | 0 | 1 | 1 | 1 | 1 | 0 |
| 1 | 0 | 0 | 0 | 1 | 1 | 0 | 0 | 1 | 0 | 0 | 0 | 0 |
| 1 | 0 | 0 | 1 | 1 | 1 | 1 | 0 | 0 | 0 | 1 | 0 | 0 |

TABLE 4

| 0 | 0 | 0 | 0 | 0 | 0 | 0 | 0 | 0 | 0 |
|---|---|---|---|---|---|---|---|---|---|
| 0 | 0 | 0 | 1 | 0 | 0 | 0 | 1 | 0 | 0 |
| 0 | 0 | 1 | 0 | 0 | 0 | 1 | 0 | 1 | 0 |
| 0 | 0 | 1 | 1 | 0 | 0 | 1 | 1 | 1 | 0 |
| 0 | 1 | 0 | 0 | 0 | 1 | 0 | 0 | 0 | 0 |
| 0 | 1 | 0 | 1 | 0 | 1 | 0 | 0 | 1 | 0 |
| 0 | 1 | 1 | 0 | 0 | 1 | 1 | 1 | 1 | 0 |
| 0 | 1 | 1 | 1 | 1 | 0 | 0 | 0 | 1 | 0 |
| 1 | 0 | 0 | 0 | 1 | 0 | 1 | 0 | 0 | 0 |
| 1 | 0 | 0 | 1 | 1 | 0 | 1 | 1 | 0 | 0 |

Firstly, a control signal (S-3090 in FIG. 4) is generated by the timing control means 8 on a signal line 3090 so that the adder 33 and the counter 32 are cleared. Then, when control signals (S-3091, S-3092 and S-3093) appear on signal lines 3091, 3092 and 3093, outputs of the converters 3031, 3032 and a gate 3034 in turn are selected in the selector 331 and transferred to the adder 33. The gate 3034 allows the output of a gate 3073 to pass therethrough when the output of an AND gate 3041 is 0. As shown in FIG. 4, no signal is fed to the signal lines 3090, 3091 and 3093 until a new input character string is fed from the optical character recognition system 1 to the input-character-string storing means 2. The flip-flops 3021, 3022 and 3023 are reset before the new input character string is supplied to the storing means 2. If the input character string is of the pattern ($\alpha \beta \Delta$), the output of the AND gate 3041 is 1 since the flip-flops 3021 and 3022 remain reset, while in the case of the pattern ($\alpha$ ? $\gamma$), only the flip-flop 3022 is set so that the output of an AND gate 3042 will be 1. In the case of the pattern (? $\beta$ $\gamma$), only the flip-flop 3021 is set so that the output of an AND gate 3043 will be 1.

Block spacings 1, 10 and 100 are each set in registers 3061, 3062, and 3063 for sequentially designating the blocks in the word storing means 6. In the case of the patterns ($\alpha \beta \gamma$) or ($\alpha \beta \Delta$), the contents 1 of the register 3061 is set in the register 31, while in the case of the pattern ($\alpha$ ? $\gamma$), and the contents 10 of the register 3062 is set therein. Furthermore, in case of the pattern (? $\beta$ $\gamma$), the contents 100 of the register 3063 is set therein. If a pattern is any one of the specified patterns ($\alpha \beta \gamma$), ($\alpha \beta \Delta$) ($\alpha$ ? $\gamma$) or (? $\beta$ $\gamma$), the output of an OR gate 3050 is 1. As has been described previously, upon the completion of the comparison of the input character string with words within a single block in the word storing means 6, a signal (S-591 (A) in FIG. 4) is generated by timing control means 8 of FIG. 1 on the signal line 591, and the contents of the register 31 in which the block spacing has been set are selected as an input through the selector 331 for the counter 33 so that the number of the block to be compared with the input character string is increased. Also, when a signal appears on the signal line 592 branched from the signal line 591 causing the contents of the counter 32 to become 10, a signal is fed to the signal line 321 from the counter 32 to indicate that the input character string has been compared with words of 10 blocks in the means 6. In the case where the input character string belongs to none of the aforesaid patterns, the output of an OR gate 3050 will be 0 so that the output of an inverter 3051 will be 1. The output 1 of the inverter 3051 denotes the impossibility of recognition, and a signal is fed through the signal line 323 to the timing control means 8.

Figure 3:
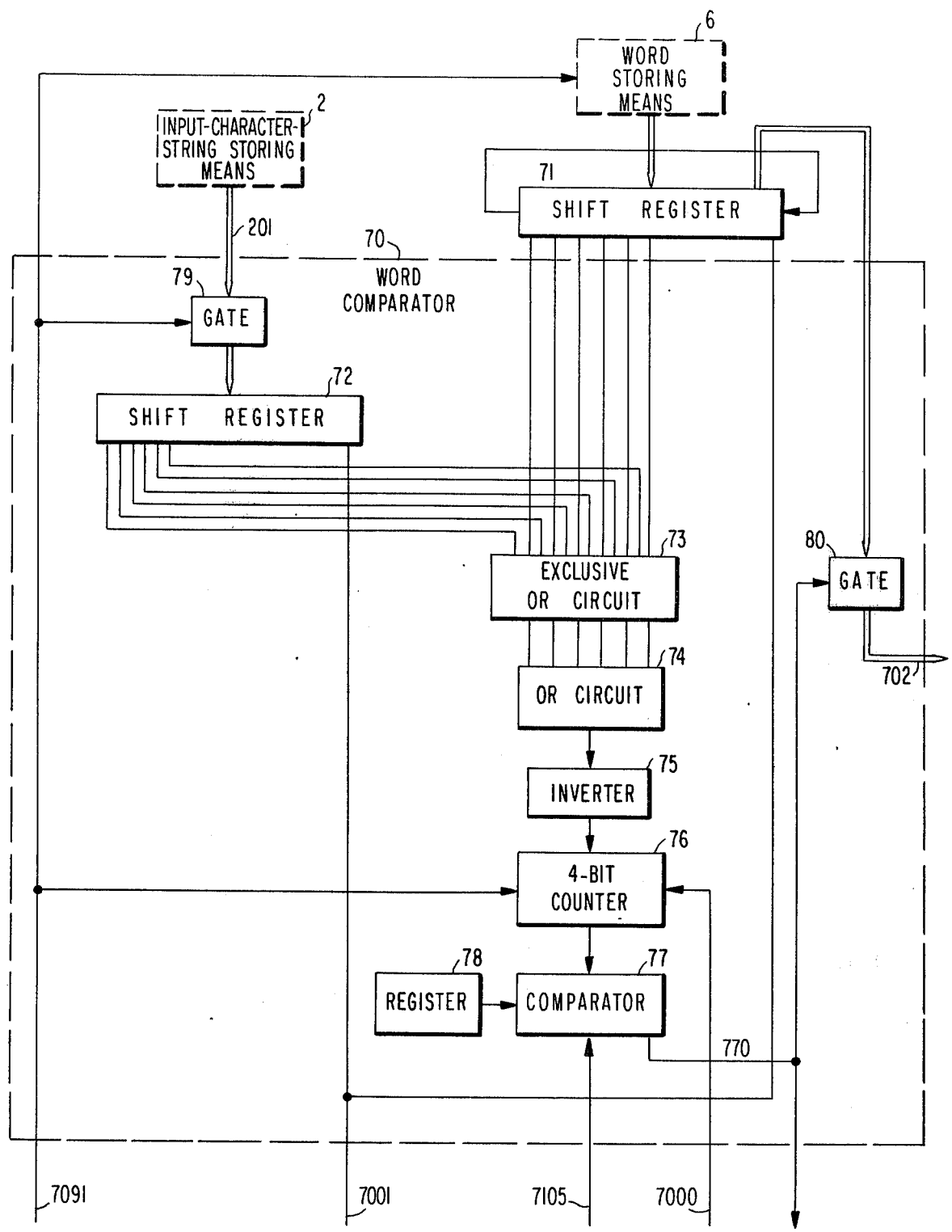
FIG. 3 shows a diagram illustrating in detail the word comparing means 7 of FIG. 1.

FIG. 3 shows the structure of the word comparing means 7. The input character string in the storing means 2 is set in a shift register 72, having 90 bit positions corresponding to 15 characters, through a gate 79, while a single word from the word storing means 6 is set in the circulating-type shift register 71, also having 90 bit positions corresponding to 15 characters. At the same time, a counter 76 is cleared to 0. WIth respect to 6 bits on the respective left sides of the shift registers 71 and 72, modulo 2 addition is effected in an Exclusive OR circuit 73. The outputs of the circuit 73 are connected to an OR circuit 74. Furthermore, the output of the OR circuit 74 is connected to an inverting circuit 75, the output of which is counted by a counter 76 having 4 bits, when a control signal (S-7000 ($a1$)) is fed to a signal line 7000. Thus, 6 corresponding bits in shift registers 71 and 72 are compared. Firstly, a signal appears on the signal line 7000, and the shift registers 71 and 72 are shifted to the left-hand portion according to six consecutive control signals (S-7001 (a)) on a signal line 7001. As a result, respective six bits on the left sides of the shift registers 71 and 72 are advanced to a new character. Thus, the number of times at which the characters in the registers 71 and 72 are in coincidence with each other is counted by the counter 76. When the feeding of the control signals to the lines 7000 and 7001 is repeated 15 times, a signal (S-701 (a) in FIG. 4) appears on a signal line 7105. According to the signal thus fed, the contents of the counter 76 is compared in a comparator 77 with the contents of a register 78 of 4 bits in which a constant 13 has been set, provided that the non-coincidence of two characters is allowed. If in this case the contents of the counter 76 exceeds the contents of the register 78, a signal appears on a signal line 770 so that a gate 80 is opened, and as a result, a word stored in the shift register 71 by circulating one turn is fed to the signal line 702 as the solution.

Next, the flow of the overall processing of the word recognition apparatus of the present invention will be described in conjunction with FIGS. 1 to 4. It is assumed here that the address entered on a postal matter is ENSEMBLE and that the character recognition system 1 recognizes the address as "E?SE??IE" which is set in the input-character-string storing means 2.

Characters E?S are set in the converters 3001, 3002 and 3003 of FIG. 2, respectively. From Table 1, the characters E and S are coded to 2 and 7 (according to a binary representation, they are 0010 and 0111) in the converters 3001 and 3003, respectively. Since a symbol "?" representing the rejection is detected in the detector 3012, the flip-flop 3022 is set. Consequently, the output of the AND gate 3042 will be 1. Thus, a value 10 representing the block spacing set in the register 3062 is transferred to the register 31 to sequentially designate blocks in the word storing means 6 of FIG. 1. A value 200 (11001000 according to the binary representation) is generated by the converter 3031, while the output of the converter 3003 passes through the gate 3034, since the flip-flop 3023 remains reset and the output of AND gate 3041 is 0. Inasmuch as the input information to the converter 3002 is a rejection signal ?, the output of the converter 3032 remains zero. As a result, both the output value 200 of the converter 3031 and the contents 7 of the converter 3003 are added to the adder 33 to give a value 207.

Since the output of the AND gate 3042 becomes 1, the output of an OR gate 3050 becomes 1. As a result, a signal on the signal line 323 is 0. Depending on the contents 207 of the adder 33, the contents 2000 at address 207 of the block-starting-address storing means 40 are set in the address counter 51 of FIG. 1 as a block starting address. Then, depending on the contents 208 of the adder 43 of FIG. 1 obtained by adding a 1 to the contents 207 of the adder 33 of FIG. 2, the contents 2062 at address 208 of the means 40 are set in the register 52 of FIG. 1 as a block limit address. Thereafter, a word "EAR" of Table 2 in the word storing means 7 designated by the contents 2000 of the address counter 51 is first set in the register 71 of the word comparing means 7 of FIG. 3, and compared in the word comparator 70 with the input character string E?SE??IE fed to the shift register 72 from the storing means 2. Every time the comparison is completed, a control signal is fed to the signal line 701 from the timing control means 8 of FIG. 1 and thus, a value 1 is added to the address counter 51, while words of a block having a code 207 having addresses 2000 to 2061 in the word storing means 6 are sequentially read into the shift register 71, and are compared with the input character string E?SE??IE.

Then, as soon as the contents of the address counter 51 becomes 208 and equal to the contents of the register 52 representing the block limit address, a signal is fed from the comparator 59 of FIG. 1 to the signal lines 591 and 592. As a result, the contents 10 of the register 31 which stores a block spacing is added by the adder 33 to give a value 217, and the counter 32 becomes 1 by counting 1. After this, words of a block having a code 217 in the means 6 are sequentially compared with the given input character string. Even if the correct solution ENSEMBLE in a block having a code (257) is set in the shift register 71, the number of the coincidence characters becomes 11 falling short of the constant 13 of the register 78. For this reason, the contents of the shift register 71 can not be produced as the output for a solution to the signal line 702 through the gate 80 of FIG. 3. When the comparsion of the input character string with words having a code (297) is completed in this manner, the contents of the counter 32 of FIG. 2 becomes 10 so that a signal appears on the signal line 321. At this time, the timing control means 8 produces a signal 1 representing the impossibility of recognition on the signal line 703. If the input character string is E?SEMBLE, the number of the characters coincident with the correct solution ENSEMBLE will be 14, since the coincidence of the space is counted, thus exceeding the constant 13 of the register 71. Accordingly, ENSEMBLE is produced as the correct solution from the shift register 71 through the gate 80 to the signal line 702.

In the above-mentioned description, although the word comparing means 7 in this embodiment uses the simplest method for simplicity of description, means 7 may adopt any other method instead thereof.

In addition, the respective words are stored in a fixed length in the word storing means 6, but they may be stored in a variable length in the means 6. The handling of words of variable length is practically found in a conventional character machine-type computer for business use.

The binary adder 33 used in the embodiment may be embodied by the adding circuit disclosed on Page 344, FIGS. 9–34 of the text by Jacob Millman et al. entitled, *Pulse, Digital and Switching Waveforms*, published by McGraw-Hill, Inc. in 1965. Also, the word storing means 6 and block-starting-address storing means 40 may be readily practiced by using memories shown in FIG. 14.1 on Page 250 of the text by Frederick F. Sellers, Jr., et al. entitled, *Error Detection Logic for Digital Computers*, published by McGraw-Hill, Inc. in 1968 and the converters 3001, 3002, 3003, 3031 and 3032 may be likewise implemented by using a combination of an encoder shown on Page 353 with a decoder on Page 349 of the same publication. Furthermore, the counters 51, 32, 33 and 76 (binary) shown in FIGS. 1 to 3 may be readily realized by those shown in Pages 1-7 to 1-9 (particularly FIGS. 1-9 and 1-10 of the text, *Transistorized Circuits for Digital Computers*, published by John F. Rider Publisher, Inc., 1959, and the comparators 59, 3011, 3012 and 3013 may be likewise practiced by using those shown on Pages 2-32 and 2-33 (particularly FIGS. 2-31).

I claim:

1. A word recognition apparatus for use with a character recognition system, comprising:
   a. word storing means for storing a plurality of words to be retrieved in block units in the order of block numbers so that characters placed in one or more given positions of a word forming an input character string are used as a retrieving key corresponding to one of said block numbers;
   b. block-starting-address storing means for storing starting addresses of the block units in said word storing means;
   c. block-starting-address and limit-address taking-out means for taking out a block starting address and a block limit address corresponding to a block number next to the designated block number from the block-starting-address storing means;
   d. input-character-string storing means for storing the input character string recognized by said character recognition system;
   e. block-number determining means for sequentially designating the block numbers of blocks containing words having recognized characters placed in said given positions of said input character string;
   f. word taking-out means for sequentially taking out words stored in the addresses from the block starting address of said word storing means to an address short of said block limit address by using the starting address and the block limit address which are taken out from the block-starting-address storing means with a block number used as the retrieving key; and
   g. word comparing means for detecting a word similar to the input character string to a degree over a given value by the comparison of the words thus taken out with said input character string.

2. A word recognition apparatus as recited in claim 1 wherein said block-number determining means comprises:
   a. character pattern classifying means connected to said input-character-string storing means and responsive to characters placed in said given positions including rejection symbols generated by said character recognition system for generating an initial block number corresponding to the recognized characters in said given positions and for generating a block spacing value corresponding to the rejection symbols;
   b. block spacing register means responsive to said character pattern classifying means for storing said block spacing value;
   c. adder means connected to receive said initial block number from said character pattern classifying means and said block spacing value from said block spacing register means for sequentially generating said block numbers; and
   d. counter means for counting the number of block numbers generated by said adder means and generating a signal indicating that all blocks containing words having recognized characters of characters placed in said given positions have been taken out of said word storing means and compared in said word comparing means with the string of characters stored in said input-character-string storing means.

3. A word recognition apparatus as recited in claim 2 wherein at least three characters in said given positions of a word forming an input character string are used as the retrieving key corresponding to one of said block numbers and said character pattern classifying means comprises:
   a. first, second and third code generating means connected to said input-character storing means for generating weighted codes corresponding respectively to each recognized character in one of said given positions, said weighted codes being added by said adder means to form said initial block number;
   b. first, second and third rejection symbol detectors connected to said input-character storing means for generating outputs indicating when no recognized character is in a respective one of said given positions; and
   c. block spacing generating means responsive to the outputs of said first, second and third rejection symbol detectors for generating a block spacing value depending on which given position has no recognized character.

4. A word recognition apparatus as recited in claim 3 wherein said character pattern classifying means further comprises means responsive to two or more outputs from said first, second and third rejection symbol detectors for generating a signal indicating that recognition of the string of characters stored in the input-character-string storing means is impossible.

* * * * *

UNITED STATES PATENT OFFICE
CERTIFICATE OF CORRECTION

Patent No. 4,010,445      Dated March 1, 1977

Inventor(s) Yukio Hoshino

It is certified that error appears in the above-identified patent and that said Letters Patent are hereby corrected as shown below:

Column 4, line 54 - delete "($\{\{\triangle$ )" and insert -- ($\{ \triangleleft \triangle$) -- line 55 - delete "($\{$ ? $\triangleleft$ )" and insert -- ($\{$ ? Y ) --

Column 8, line 24 - before "the contents" delete "and"

line 58 - delete "WIth" and insert -- With --

Column 9, line 25 - delete ENSEMBLE and insert -- "ENSEMBLE" -- line 26 - delete "E?SE??IE" and insert -- "E?SE??LE" -- line 65 - delete E?SE??IE and insert -- "E?SE??LE" --

Column 10, line 5 - delete E?SE??IE and insert -- "E?SE??LE" -- line 16 - delete ENSEMBLE and insert -- "ENSEMBLE" -- line 29 - delete E?SEMBLE and insert -- "E?SEMBLE" -- lines 30-31 - delete ENSEMBLE and insert -- "ENSEMBLE" -- line 33 - delete ENSEMBLE and insert -- "ENSEMBLE" --

UNITED STATES PATENT OFFICE
CERTIFICATE OF CORRECTION

Patent No. 4,010,445            Dated March 1, 1977

Inventor(s) Yukio Hoshino

It is certified that error appears in the above-identified patent and that said Letters Patent are hereby corrected as shown below:

Column 11, lines 14-15, delete "block number next to the".

Signed and Sealed this fifth Day of July 1977

[SEAL]

Attest:

RUTH C. MASON  
Attesting Officer

C. MARSHALL DANN  
Commissioner of Patents and Trademarks